(12) United States Patent
Bhanage et al.

(10) Patent No.: US 10,257,712 B2
(45) Date of Patent: Apr. 9, 2019

(54) METHOD AND APPARATUS FOR INFERRING WIRELESS SCAN INFORMATION WITHOUT PERFORMING SCANNING OR PERFORMING LIMITED SCANNING

(71) Applicant: Aruba Networks, Inc., Sunnyvale, CA (US)

(72) Inventors: Gautam Bhanage, Sunnyvale, CA (US); Manoj Gupta, Santa Clara, CA (US); Parthasarathy Narasimhan, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/925,843

(22) Filed: Mar. 20, 2018

(65) Prior Publication Data

US 2018/0213406 A1 Jul. 26, 2018

Related U.S. Application Data

(63) Continuation of application No. 14/609,218, filed on Jan. 29, 2015, now Pat. No. 9,936,391.

(51) Int. Cl.
*H04W 48/20* (2009.01)
*H04W 16/00* (2009.01)
(Continued)

(52) U.S. Cl.
CPC .......... *H04W 16/00* (2013.01); *H04W 24/02* (2013.01); *H04W 48/20* (2013.01); *H04W 48/08* (2013.01); *H04W 84/12* (2013.01)

(58) Field of Classification Search
CPC ..... H04W 48/08; H04W 48/16; H04W 48/20; H04W 16/00; H04W 24/02; H04W 84/12; H04W 36/10; H04W 64/00
See application file for complete search history.

(56) References Cited

U.S. PATENT DOCUMENTS

2009/0028120 A1  1/2009 Lee
2013/0058310 A1  3/2013 Park

OTHER PUBLICATIONS

Park et al., Selective Channel Scanning for Fast Handoff in Wireless LAN using Neighbor Graph, Jul. 6-8, 2004, 10 Pgs.

(Continued)

*Primary Examiner* — Jae Y Lee
*Assistant Examiner* — Aixa A Guadalupe Cruz
(74) *Attorney, Agent, or Firm* — Hewlett Packard Enterprise Patent Department (57) ABSTRACT

According to one embodiment of the invention, a non-transitory computer readable medium comprising instructions which, when executed by one or more hardware processors, cause performance of operations comprising entering, by a first access point associated with a wireless network, a first mode for collecting network data from one or more access points associated with the wireless network, entering, by the first access point, a second mode for transmitting data to and from one or more client devices associated with the wireless network, and when a number of access points associated with the wireless network is greater than or equal to a number of channels of the wireless network, (i) collecting, by the first access point, network data of a first channel of the wireless network and (ii) receiving, by the first access point, network data of a second channel of the wireless network from a network coordination device is shown.

20 Claims, 4 Drawing Sheets

(51) Int. Cl.
*H04W 24/02* (2009.01)
*H04W 48/08* (2009.01)
*H04W 84/12* (2009.01)

(56) References Cited

OTHER PUBLICATIONS

Shin et al., Improving the Latency of 802.11 Hand-offs using Neighbor Graphs, Jun. 6-9, 2004, 14 Pgs.

METHOD AND APPARATUS FOR INFERRING WIRELESS SCAN INFORMATION WITHOUT PERFORMING SCANNING OR PERFORMING LIMITED SCANNING

This application is a Continuation of U.S. application Ser. No. 14/609,218 filed on Jan. 29, 2015, the content of which are incorporated herein by reference in its entirety. The Applicant hereby rescinds any disclaimer of claim scope in the parent application or the prosecution history thereof and advices the USPTO that the claims in this application may be broader than any claim in the parent application.

FIELD

Embodiments of the disclosure relate to wireless networking. More specifically, some embodiments of the disclosure relate to eliminating periodic scanning of wireless channels performed by network devices of the wireless network in order to improve overall network performance.

GENERAL BACKGROUND in recent years, there has been a substantial increase in the use and deployment of wireless client devices, from dual-mode smartphones to laptop computers to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

For example, multiple access points may jointly serve a common area. In many situations, each access point periodically scans multiple wireless channels supported by the network to determine characteristics of each channel. However, the scanning performed by the access points is an inherently disruptive process. For instance, when scanning, an access point is temporarily inaccessible to data communications with a client device, which may result in missed data frames from client device(s) and/or missed beacon frames transmitted other access point(s).

The performance of scanning by access points on the wireless network may provide each access point with data regarding its radio frequency (RF) neighborhood, such as the RF characteristics of access points associated with the wireless network, namely neighboring access points, and client devices within the signal coverage area of the wireless network. However it would be highly advantageous for a wireless network through realization of reduced wireless network traffic or increased network stability through reduction of missed data frames if the RF characteristics could be obtained without scanning.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The disclosure may best be understood by referring to the following description and accompanying drawings that are used to illustrate embodiments of the disclosure.

DETAILED DESCRIPTION

Various embodiments of the disclosure relate to obtaining and inferring wireless scanning information without performing scanning after a radio frequency (RF) neighborhood graph has been generated. Upon initialization of a wireless communication network, the access points (APs) all switch to a prescribed channel and collectively conduct a progressive beacon transmission process, in which each designated AP transmits a beacon and the other remaining APs within the system monitor to determine whether the beacon is detected. This process continues until each AP within the network has transmitted its beacon. The information collected from this progressive beacon transmission process may be used to generate a RF neighborhood graph, which features a logical representation of the geographic orientation of the APs.

According to one embodiment of the disclosure, each AP may utilize the information detected during the beacon transmission process along with information detected by other APs to generate the RF neighborhood graph. Alternatively, or in addition to, each AP may transmit the information collected during the beacon transmission process to a network coordination device (NCD). Subsequently, the NCD may generate the RF neighborhood graph that portrays the relative geographic locations of each of the APs within the communication network. The RF neighborhood graph may be provided to the APs through a "push" or "pull" delivery mechanism. As APs are not typically mobile devices, the RF neighborhood graph should remain constant unless an AP is added to the communication network, an AP is removed from the communication network, or an interference source is added to the communication network.

Upon generation of the RF neighborhood graph, the APs can eliminate scanning "foreign channels" (e.g., channels on which the AP is not operating) and remain on its "home" channel (e.g., the channel on which the AP is operating). Each AP may receive Probe Request messages from client devices within the communication network and transmit data collected from the Probe Request messages to the NCD. The NCD may subsequently propagate the collected data among the APs in order to confirm the location of each AP on the RF neighborhood graph or update the RF neighborhood graph (e.g., to indicate a change in signal coverage area of an AP). In addition, the collected data from the Probe Request messages may allow the NCD and/or each AP to balance the load throughout the communication network.

I. Terminology

Herein, certain terminology is used to describe features within embodiments of the invention. For example, the term "network device" generally refers to, in some embodiments, as electronic equipment that may be configured with a radio antenna that enables transmission and/or receipt of wireless messages over a wireless network. Hence, the network device is further adapted with circuitry to support wireless connectivity with other network devices being part of the wireless network. Different types of network devices may include, but are not limited or restricted to (1) a client device and (2) an edge device.

Herein, the term "client device" may refer to, in some embodiments, a stationary network device (e.g., desktop computer, television, set-top box, video gaming console, etc.) or a mobile network device capable of connecting to one or more wireless networks. Illustrative examples of mobile network devices may include, among others, a tablet, laptop, netbook, barcode scanner, a digital camera and/or a mobile handset such as a smartphone or a personal digital assistant "PDA." Likewise, the term "access point" of "AP" refers to a network device, a type of edge device in particular, that controls access to a network, where the AP may be deployed as a wired access point that features wired connectivity with one or more client devices or as a wireless access point that features wireless connectivity with one or more client devices. Of course, other types of edge devices that may utilize the inventive aspects described herein include a wireless base station, a cellular base station or any network device figured as a hot spot or gateway for network connectivity.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, an example of "logic" includes hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/ dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "network coordination device (NCD)" should be understood as a network device that the capability of coordinating the operations of the APs associated with (e.g., communicatively coupled to) the communication network. The NCD may be a hardware controller, a dedicated AP or a "master" AP, a slave controller or other network device.

The term "radio frequency (RF) neighborhood data" includes any characteristic of a communication network. Examples of RF neighborhood data may include, but are not limited or restricted to, the media access control (MAC) address of each AP, the MAC address of each client device, a signal strength of a received Probe Request message (hereinafter "probe request"), the time of receipt of each probe request, the location of each AP associated with the communication network, a channel on which each AP is operating, the location of each client device, the AP to which each client device is associated, the load on each channel of the communication network, specific operating requirements of any client device if applicable, or the like.

The term "RF neighborhood graph" should be understood, in some embodiments, as a logical construct of the locations of each AP within the communication network. Additionally, the RF neighborhood graph may include the locations of one or more client devices also associated with the communication network. The RF neighborhood graph provides information to each AP as to any neighboring APs. The term "neighboring AP" generally refers, in some embodiments, to an AP within a predetermined number of "hops" within a communication network from a second AP, wherein a hop refers to the inclusion of the first AP within the signal coverage area of the second AP. The terms "RE neighborhood graph" and "neighboring AP" will be explained in detail below according to FIG. 2.

A "message" generally refers to information transmitted as information in a prescribed format, where each message may be in the form of one or more packets or frames, an IEEE-based frame format, or any other series of bits having the prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Communication Network Architecture

Figure 1:
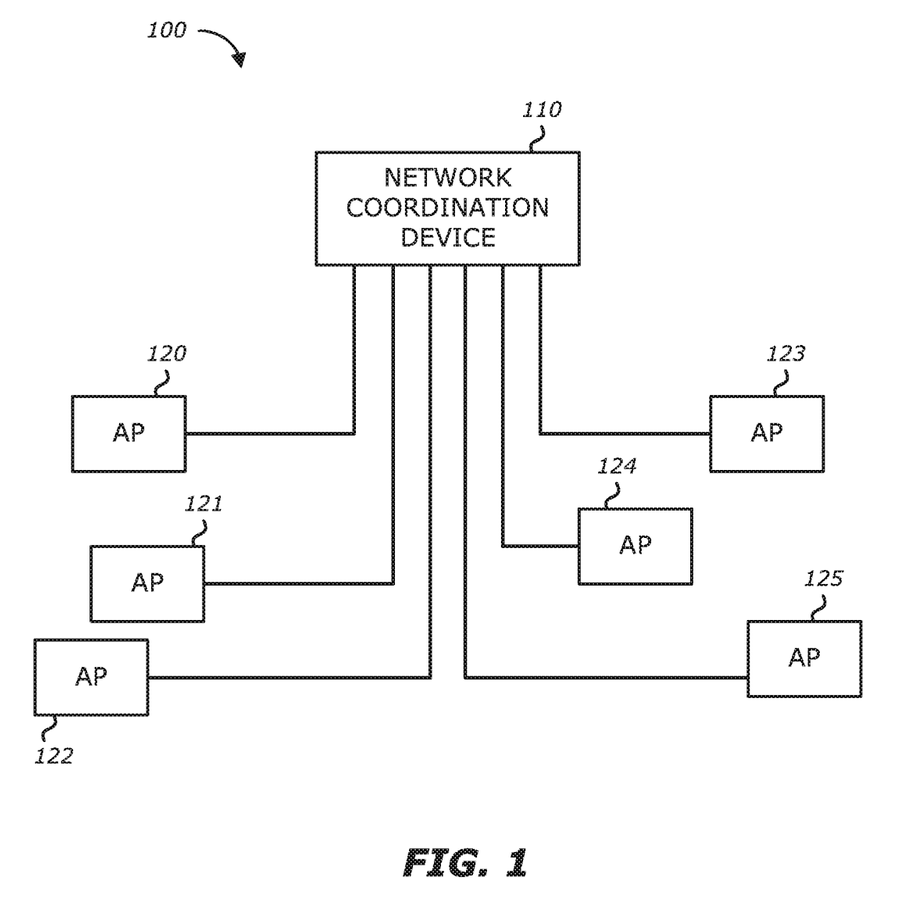
FIG. 1 is a block diagram of an exemplary network system including a plurality of access points communicatively coupled to a network coordination device.

Referring to FIG. 1, a block diagram of an exemplary network system including a plurality of access points communicatively coupled to a network coordination device is shown. The communication network 100 includes a network coordination device (NCD) 110 and the access points (APs) 120-125. The NCD 110 and the APs 120-125 provide one or more client devices (not shown) with controlled wireless access to network resources. The APs 120-125 may operate according to one or more versions of the IEEE 802.11 standards, such as the IEEE 802.11n or IEEE 802.11ac standards for example. Although one NCD 110 and six APs 120-125 are shown in FIG. 1, the communication network 100 may include additional NCDs and/or APs. In one embodiment, the NCD 110 may be configured as a centralized station communicatively coupled to the APs 120-125 via a wired connection. Alternatively, the NCD 110 may be communicatively coupled to one or more of the APs 120-125 via a wireless connection.

Figure 2:
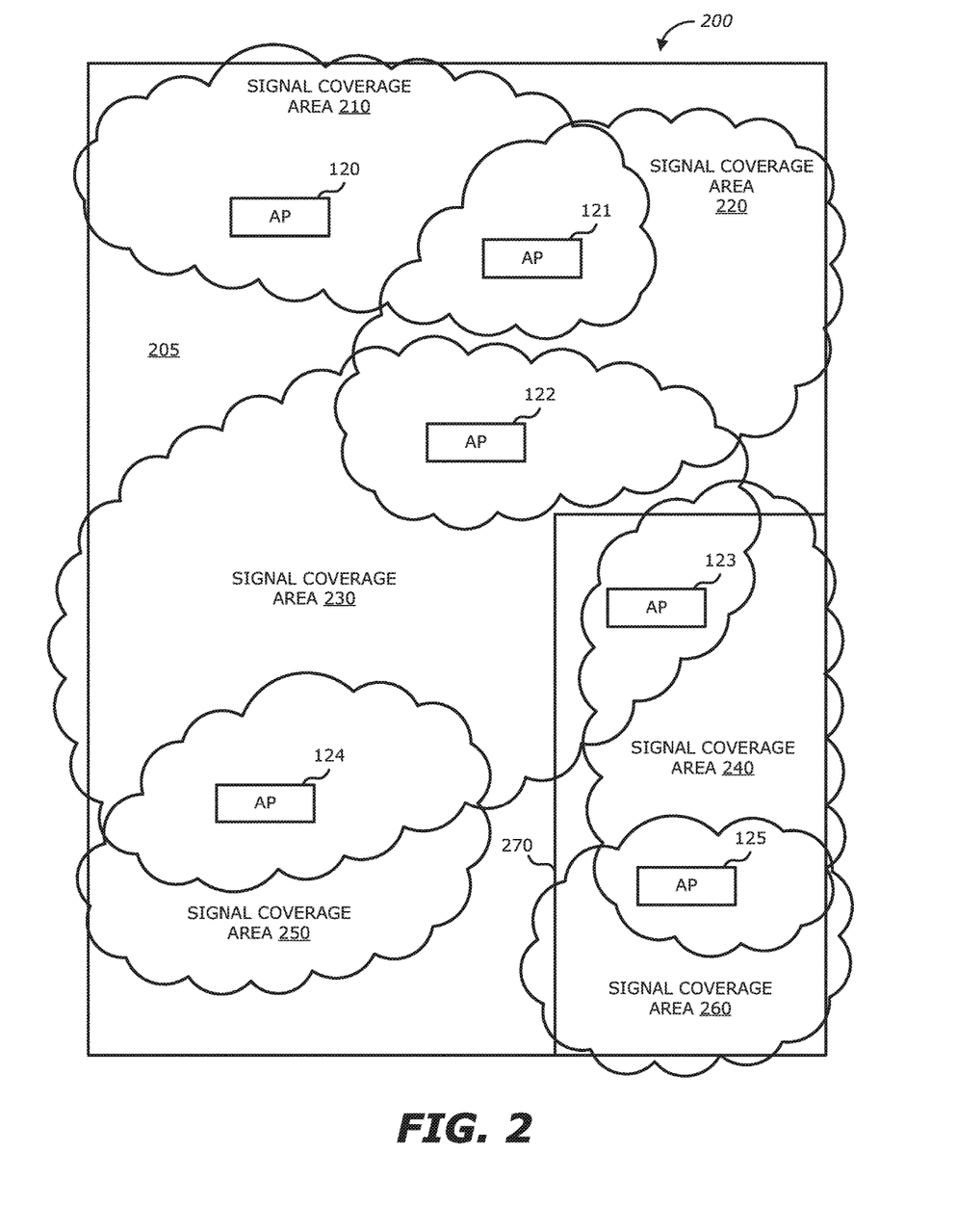
FIG. 2 is a block diagram illustrating a plurality of signal coverage areas within the network system of FIG. 1.

According to FIG. 2, a block diagram illustrating a plurality of signal coverage areas within the network system of FIG. 1 is shown. In accordance with the illustrative network topology as shown in FIG. 1, the APs 120-125 are illustrated within area 200. In addition, a signal coverage area of each of the APs 120-125 is illustrated. One or more of the signal coverage areas 210, 220, 230, 240, 250 and/or 260 may overlap or be subjected to interference caused by one or more interference sources. For example, area 200 may be comprised of a predominantly open area 205 but also include one or more areas 270 separated from the open area by an obstruction (e.g., one or more walls). In one embodiment, the predominantly open area 205 of the area 200 may be an open work environment and the obstructed area 270 may be a walled-off conference room 270. In one example, the walls of the conference room may create interference thereby adversely affecting coverage of some of the APs, namely AP 123 and. AP 125, outside the conference room 270.

When placed in an active state, the AP 120 supports a signal coverage area 210, namely a geographic signal propagation boundary, within with the AP 120 is able to transmit and/or receive wireless signals. According to this embodiment of the disclosure, the AP 121 resides within the signal coverage area 210. Furthermore, one or more client devices (not shown) may permanently or temporarily reside within the signal coverage area 210. The AP 121 and any client devices residing within the signal coverage area 210 may be detectable by the AP 120.

Similarly, the AP 121 provides a signal coverage area 220 within which the AP 122 resides. In the embodiment illustrated in FIG. 2, the signal coverage area 220 may be affected by interference created by a physical boundary, such as a wall or elevator, as shown by a walled-off section of the area 200 (e.g., the conference room 270). In one embodiment, the effect of the interference is due in part to the signal strength of the signal coverage area 220 at the conference room 270. In contrast, the physical boundary may not affect the signal coverage area 230 at its signal strength may overcome any interference created by the physical boundary.

As seen in FIG. 2, the signal coverage area of the AP 120 is illustrated as the signal coverage area 210 and includes the AP 121 within its coverage area (e.g., the AP 121 is one "hop" from the AP 120). The signal coverage area of the AP 121 is illustrated as the signal coverage area 220 and includes the AP 122. The signal coverage area of the AP 122 is illustrated at the signal coverage area 230 and includes the AP 123 and the AP 124. The single coverage area of the AP 123 is illustrated as the signal coverage area 240 and includes the AP 125. The signal coverage area of the AP 124 is illustrated as the signal coverage area 250 and the signal coverage area of the AP 125 is illustrated as the signal coverage area 260.

As discussed above, a first AP may be construed as a "neighboring AP" for a second AP based on the number of hops separating the two APs. For example, according to FIG. 2, the AP 121 is a one-hop neighboring AP to the AP 120 as the AP 121 is included within the signal coverage area of the AP 120 (e.g., the AP 121 directly receives transmissions, such as beacons, from the AP 120). In addition, the AP 122 is a two-hop neighboring AP to the AP 120 as the AP 122 is a one-hop neighboring AP to the AP 121 (the AP 122 is within the signal coverage area of the AP 121 and is therefore a one-hop neighboring AP to the AP 121) but is not within the signal coverage area of the AP 120.

As will be discussed below, the APs 120-125 may enter a discovery mode to generate a RF neighborhood graph. Being a logical construct of the relative geographic locations of each AP within the communication network 100, the RF neighborhood graph may detail the proximity of each AP (e.g., which APs are considered to be neighboring APs) to the other APs within the communication network 100 based on physical location and detected signal coverage. This proximity may be determined, in part, by the signal strength of received beacons during the discovery mode. Furthermore, the RF neighborhood graph may be adjusted (e.g., updated) based on the probe reports of each AP which may include, among other data, one or more client device MAC addresses, the signal strength of the received probe requests transmitted by each client device and the time stamp signifying the time of receipt of each probe request.

In one embodiment, a correlation of the signal strength of the probe requests of a client device received by two APs as well as the time stamp of the probe requests may signify that the two APs are within close proximity with respect to signal coverage area. For example, if both APs receive a probe request from a particular client device (known via the client device's MAC address) having a signal strength above a particular threshold and within a particular time frame (e.g., within 100 milliseconds of each other), the two APs may be classified as being within close proximity of each other with respect to signal coverage area.

Furthermore, in one embodiment, neighboring APs (e.g., APs within one hop of each other) may operate on orthogonal channels which may help reduce interference by reducing crosstalk between channels (e.g., transmissions from channel 1 being received by an AP operating on channel 2 thereby interfering with the operations of the AP). For example, referring to FIG. 2, the AP 120 and the. AP 121 may be on orthogonal channels in order to reduce interference. The operating channels of each AP may be preset at initialization and thereafter configurable by a network administrator, the AP itself and/or the NCD. in one embodiment, based on the RF neighborhood data obtained from the NCD, the AP 120 may determine that the AP 121 is not on an orthogonal channel and elect to switch its channel of operation in order to operate on an orthogonal channel to the AP 121.

III. Access Point Architecture

Figures 3, 4:
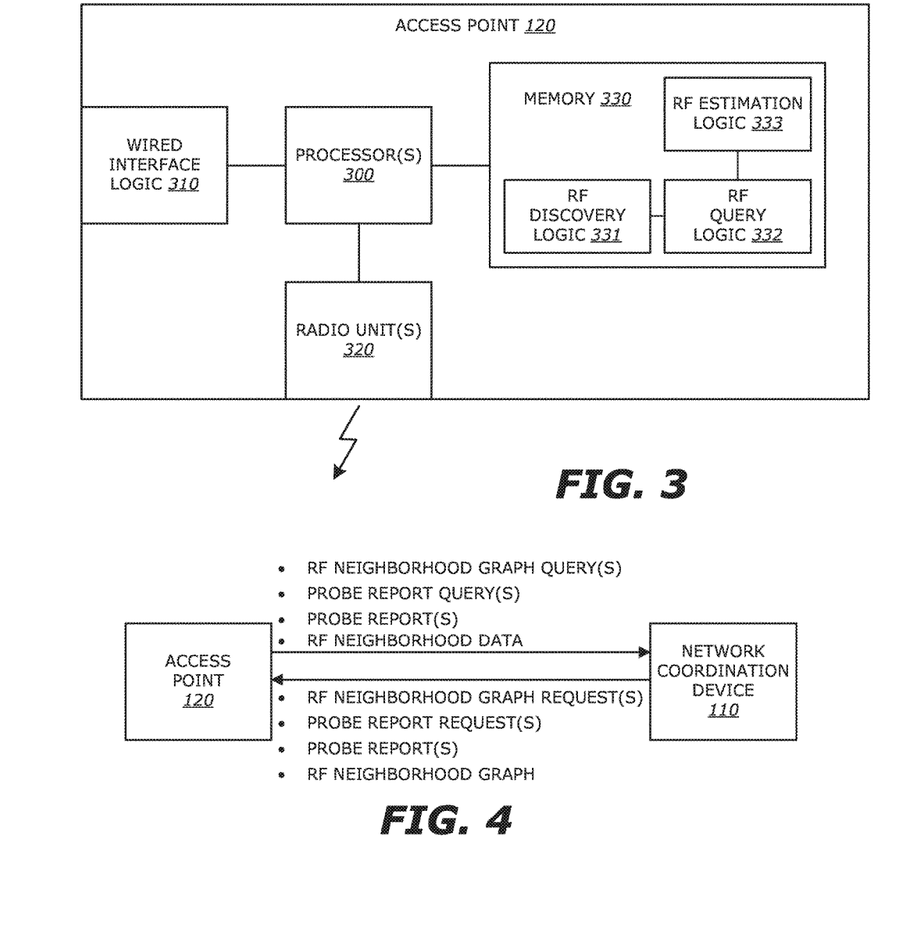
FIG. 3 is a block diagram of an exemplary logical architecture associated with an access point of FIG. 1.
FIG. 4 is a block diagram illustrating communication between an access and a network coordination device.

According to FIG. 3, a block diagram of an exemplary logical architecture associated with an access point (e.g., AP 120) is shown. The AP 120 comprises one or more processors 300 that are communicatively coupled to a wired interface logic 310, one or more radio units 320 and a memory 330. The wired interface logic 310 enables the AP 120 to be communicatively coupled to a network device, such as, for example, the NCD 110, via a wired connection. The one or more radio units 320 enable the AP 120 to communicatively couple to network devices, such as, for example, one or more client devices. Additionally, the one or more processors 300 are further coupled to a memory 330, which may be, for example, persistent storage. According to one embodiment of the disclosure, the memory 330 may include (i) the RF discovery logic 331, (ii) the RF query logic 332 and (iii) the RE estimation logic 333. Of course, when implemented as hardware, one or more of these logic units could be implemented separately from each other.

The RF query logic 332 may establish and coordinate communications with the NCD 110. In particular, the RF query logic 332 is responsible for (i) initiating probe request queries to receive probe reports collected by the NCD 110 and (ii) proving probe reports to the NCD 110, which include RF neighborhood data. For example, the RE query logic 332 may transmit collected RF neighborhood data to the NCD 110 (in either case in which the RF neighborhood data was collected using beacons or from received probe requests). The RF query logic 332 may receive the RF neighborhood graph from the NCD 110 and/or one or more probe reports transmitted by the NCD 110. The RF discovery logic 331 and the RF estimation logic 333 may instruct the RF query logic 332 to query the NCD 110 for probe reports (or for RF neighborhood data based on received beacons) transmitted to the NCD 110 by other APs within the communication network 100.

The RF estimation logic 333 may use the RF query logic 332 to obtain RF neighborhood data (such as, in one example, probe reports that include specific client devices as mentioned above) from the NCD 110. The estimation logic 333 may analyze the RE neighborhood data to provide improvements to the communication network 100.

The RF discovery logic 331 is responsible for collecting RF neighborhood data. The RF neighborhood data may be collected in a variety of ways, including, but not limited to, through (i) a collection of data associated with Beacon messages from neighboring APs within the communication network 100 at one or more times specified by the NCD 110 (e.g., at initialization of the communication network 100) and/or (ii) a collection of data associated with Probe Request messages transmitted by one or more client devices residing within one or more signal coverage areas of the communication network 100.

The RF discovery logic 331 is configured to collect RF neighborhood data from one or more Beacon messages (hereinafter referred to as "beacons") transmitted by one or more neighboring APs. When the AP 120 enters into "discovery mode," the RF discovery logic 331 controls the radio unit(s) 320 to transition to a prescribed wireless channel, transmits a beacon at a prescribed time, and continuously monitors and collects RF neighborhood data as provided in the form of beacons from other APs that are detected by the AP 120. More specifically, upon entering the discovery mode, the APs 120-125 switch to a prescribed wireless channel at a predetermined time. Thereafter, each of the APs 120-125 performs a coordinated scan of the prescribed wireless channel whereby, in one embodiment, each of the APs 120-125 transmits a beacon at a fixed signal strength and a fixed time (e.g., each of the APs 120-125 transmits at a different time). When not transmitting, each of the APs 120-125 listens on the prescribed wireless channel for beacons transmitted by the other APs and collects RF neighborhood data from the received beacons.

Typically, the AP 120 may enter discovery mode when the communication network 100 is being established and initialized. During initialization of the communication network 100, each AP of the communication network 100 may enter into discovery mode in order to transmit a beacon and monitor for beacons transmitted by other APs. The transmission and reception of beacons by each AP allows the APs to collect RF neighborhood data. As stated above, the RF neighborhood data may include, but is not limited or restricted to, the MAC address of other APs within a signal coverage area, the "home" channel on which other APs are operating, and/or the signal strength of beacons (e.g., which may allow one AP to infer the geographic distance between itself and other APs).

In addition, when the AP 120 has received probe requests from one or more client devices, as will be discussed below, prior to entering the discovery mode (e.g., when the RF neighborhood graph is being regenerated), the AP 120 may include information regarding the client devices with the transmission of the beacon while in discovery mode. For example, the AP 120 may include information regarding one or more client devices including the MAC address of each client device, the channel on which the client device was heard, the signal strength of the probe request transmitted by each client device and/or specific operating requirements of a client device.

A. Access Point Architecture with RF Neighborhood Graph Generation

1. Initial Generation of RF Neighborhood Graph

In one embodiment, upon completion of the beacon transmission process, the RF discovery logic 331 may initially generate a portion of the RF neighborhood graph by analyzing its collected RF neighborhood data to determine neighboring APs by the MAC address and signal strength included in beacons received while in discovery mode. In particular, the AP 120 determines a relative geographic location of each AP from which the AP 120 received a beacon based on signal strength of the beacon. Subsequently, the AP 120 requests, using the RF query logic 332, the RF neighborhood data collected by the other APs from the NCD 110. Upon receiving the RF neighborhood data collected by the other APs, the AP 120 may generate a complete RF neighborhood graph that includes all of the APs associated with the communication network 100.

2. Re-Generation of RF Neighborhood Graph

As APs are typically not mobile devices, once the RF neighborhood graph has been generated, the underlying structure usually does not change. Therefore, the APs associated with the communication network 100 are able to avoid routinely suspending operations (e.g., transmitting and receiving network traffic) to scan "foreign" channels to determine the characteristics of these foreign channels. However, in certain instances, such as when one or more APs have been added to the communication network 100 and/or one or more APs have not provided wireless access to the communication network 100 for at least a prescribed period of time (e.g., the AP failed, the AP was placed in an inactive state for security purposes, etc.), the network topology may have been altered such that the initial RF neighborhood graph no longer provides an accurate portrayal of the communications network 100. As a result, the APs need to enter the discovery mode in order to re-generate the RF neighborhood graph.

The amount of alteration of the network topology that triggers an update of the RF neighborhood graph may be predetermined (e.g., after a first number of APs are added and/or a second number of APs no longer provides wireless access) or may be configurable (e.g., the first number and/or second number are adjusted via software updates to the system). In addition, a regeneration of the RF neighborhood graph may be triggered manually such that, for example, a network administrator may transmit an instruction to the NCD 110 to update the RF neighborhood graph.

In one embodiment, the AP 120 may send a notification to the NCD 110 signifying that the APs should re-enter discovery mode to regenerate the RF neighborhood graph. For example, during analysis of probe reports from other APs transmitted by the NCD 110, the AP 120 may realize the communication network 100 includes an AP that is not present in the most current RF neighborhood graph. Subsequently, the AP 120 may notify the NCD 110 that the RF neighborhood graph needs to be regenerated and the NCD 110 will transmit a signal to all of the APs within the communication network 100 instructing the APs to enter discovery mode, which may include or more of at least, the specific wireless channel on which to conduct the beacon transmission process, and the signal strength at which to transmit, and/or the timing schedule for transmitting beacons.

In a second example, while in normal operation, the AP 120 may receive a beacon from an AP. The AP may be either, newly added to the communication network 100 or an AP previously associated with the communication network 100 that broadened its signal coverage area. When the AP 120 receives a beacon from an AP while in normal operating mode indicating a change in the RF neighborhood occurred, the AP 120 signifies the need to re-enter the discovery mode to re-generate the RF neighborhood graph to the NCD 110.

Similar to above, upon completion of the beacon transmission process, the AP 120 may query the NCD 110 for the RF neighborhood data collected by each of the APs within the communication network 100. Each AP subsequently generates the RF neighborhood graph based on the RF neighborhood data collected by each AP. At least one AP may transmit the re-generated RF neighborhood graph to the NCD 110.

3. Updating the RF Neighborhood Graph

During normal operation of the AP 120 (e.g., not in discovery mode), the RF discovery logic 331 may perform analysis of any probe requests received by one or more client devices. Typically, client devices will periodically suspend their operations on the wireless network to scan foreign channels in order to determine whether operation on a foreign channel and/or association with an alternative AP would provide a more advantageous connection to the wireless network (e.g., more reliable connection or faster transmission rates). A client device scans foreign channels by transmitting probe requests on different channels and analyzing Probe Responses messages (hereinafter referred to as "probe responses") received from one or more APs alerting the client device of the APs presence. When the AP 120 receives a probe request from a client device, the RF discovery logic 331 may record, among other information, the MAC address of the client device (included in the probe request), the time of receipt of the probe request (e.g., a timestamp) and the signal strength of the probe request.

In some instances, the location of a client device may be determined from analysis of one or more probe reports based on the signal strength of the client device's probe request reported by one or more APs. For example, three APs may each receive a probe request from a client device (identified by the MAC address within the probe request) having the same signal strength. Therefore, one or more of the APs may determine that the client device is located in the center of the three APs and equidistant from each (e.g., by using trilateration). Similarly, the AP 120 may update and/or confirm the RF neighborhood graph by determining the approximate location of one or more APs based on probe requests received by each AP (e.g., by using trilateration).

For example, referring to FIG. 2, when the APs 120-122 receive a probe request from a single client device within a predetermined timeframe and with a signal strength above a predetermined threshold, but the APs 123-125 do not receive the probe request, the AP 120 may infer that the APs 123-125 are not neighboring APs within the communication network 100 (e.g., not one-hop APs). In addition, based on the signal strength of the probe request received by each of the APs 120-122, the RF discovery logic 331 of the AP 120 may determine the relative distance of the AP 120 from the APs 121 and AP 122, thereby updating and/or confirming the RF neighborhood graph. The information regarding the probe requests (e.g., client device MAC address, signal strength of probe request received by the APs 120-122 and the timestamp of each received probe request) may be included in a probe report transmitted by the NCD 110.

In one embodiment, the RF discovery logic 331 may instruct the RF query logic 332 to query the NCD 110 for probe reports that include one or more particular client device. For example, the AP 120 may receive a probe request from a client device having a MAC address of "MAC_Address_1." The RF query logic 332 may query the NCD 110 for all probe reports that include "MAC_Address_1." Based on these probe reports, the RF discovery logic 331 of the AP 120 may determine the location of one or more APs.

In yet another embodiment, in order to improve the accuracy of RF neighborhood data collected from probe requests (e.g., probe reports), the APs utilizing the probe reports may only use data collected from probe requests transmitted by client devices that have remained associated with a single AP for a predetermined amount of time. This improves the accuracy of the RF neighborhood data because maintaining association with a single AP for a predetermined amount of time generally implies that the client device is not moving over a large area within the wireless network. Typically, when a client device disassociates from a first AP and associates with a second AP, the client device has physically moved (e.g., roamed). Therefore, in order to avoid using data collected from a roaming client device, probe requests received from a client device transitioning from a first AP to a second AP within the predetermined time frame after transmitting the probe request may be ignored for purposes of updating and/or confirming the RF neighborhood graph and/or for load balancing as will be discussed below.

In one embodiment, the RF discovery logic 331 may instruct the RF query logic 332 to query the NCD 110 for probe reports that include particular client devices. For example, the AP 120 may receive a probe request from a client device having a MAC address of "MAC_Address_1." The RF query logic 332 of the AP 120 may query the NCD 110 for all probe reports that include "MAC_Address_1." Based on these probe reports, the RF discovery logic 331 of the AP 120 may determine the location of one or more APs.

4. Load Balancing

In one embodiment, the RF estimation logic 333 may analyze the RF neighborhood graph to determine neighboring APs, the load on each AP and the location of one or more client devices. Based on this information, the RF estimation logic 333 may attempt to balance the load on the communication network by increasing its signal power to attract more client devices or hand-off one or more client devices to other APs with a lighter load.

In some embodiments, the AP 120 may query the NCD 110 for probe reports, which may include the type of traffic being transmitted by the client device. When the probe reports include the type of traffic being transmitted by each client device, the RF estimation logic 333 may balance the load of one or more APs by attracting or handing-off client devices transmitting certain types of traffic. For example, the RF estimation logic 333 may increase its signal power in order to attract client devices from a neighboring AP (e.g., the AP 121) when the AP 121 is handling numerous client devices all transmitting video data (e.g., traffic that places a heavy burden on the network).

In addition, the RF estimation logic 333 may be used to steer clients requesting to the join the communication network 100. For example, the RF estimation logic 333 of the AP 120 may determine that a client device attempting to join the communication network 100 is best suited to associate with the AP 121 based on the loads currently being handled by the AP 120 and the AP 121. Therefore, the AP 120 can deny a request to associate by the client device so that the client device associates with the AP 121.

B. Access Point Architecture with Reliance on Network Coordination Device for RF Neighborhood Graph Generation In an alternative, or in addition, to the processing associated with generating, re-generating and/or updating of the RF neighborhood being performed on one or more APs, the NCD 110 may perform one or more of the processing to generate, re-generate and/or update the RF neighborhood graph.

1. Initial Generation of RF Neighborhood Graph

In a first embodiment, upon completion of the beacon transmission process, each of the APs 120-125 transmit, via RF query logic, the RF neighborhood data each collected during discovery mode to the NCD 110. The NCD 110 analyzes all of the collected RF neighborhood data from each of the APs 120-125 to generate the RF neighborhood graph by analyzing the MAC address and signal strength included in beacons received by the APs 120-125 while in discovery mode. In particular, the NCD 110 determines a relative geographic location of each AP within the communications network 100 based on the receiving MAC address (e.g., MAC address of the AP that received the beacon), the transmitting MAC address (e.g., the MAC address of the AP that transmitted the beacon), and the signal strength of the received beacon. Subsequently, the NCD 110 distributes the RF neighborhood graph to each of the APs 120-125.

In a second embodiment, the AP 120 may generate a portion of the RF neighborhood graph based on the data the AP 120 collected from received beacons while in discovery mode. The AP 120 transmits the portion of the RF neighborhood graph to the NCD 110. Similarly, each of the APs 121-125 generates a portion of the RF neighborhood graph based on the data each collected from received beacons and transmits the portion of the RF neighborhood graph to the NCD 110. Subsequently, the NCD 110 correlates each portion of the RF neighborhood graph generated by the APs 120-125 and generates a complete RF neighborhood graph. The NCD 110 then transmits the complete RF neighborhood graph to the APs 120-125.

2. Re-Generation of RF Neighborhood Graph

When the NCD 110 is responsible for generating the RF neighborhood graph, the NCD 110 may, during analysis of one or more probe reports received from one or more of the APs within the communication network 100, determine the communication network 100 includes an AP that is not present in the most current RF neighborhood graph. Subsequently, the NCD 110 will transmit a signal to all of the APs within the communication network 100 instructing the APs to enter discovery mode, which may include or more of at least, the specific wireless channel on which to conduct the beacon transmission process, and the signal strength at which to transmit, and/or the timing schedule for transmitting beacons.

Similar to above, upon completion of the beacon transmission process, each AP within the communication network 100 transmits the RF neighborhood data collected while in discovery mode to the NCD 110. The NCD 110 subsequently generates the RF neighborhood graph based on the RF neighborhood data collected by each AP and distributes the re-generated RF neighborhood graph to each AP within the communication network 100.

3. Updating the RF Neighborhood Graph

In one embodiment, the AP 120 may transmit a probe report comprising the data collected from one or more probe requests to the NCD 110. The NCD 110 may analyze the probe reports from one or more APs (e.g., the APs 120-125) and subsequently distribute RF neighborhood data to one or more APs notifying the APs of relative geographic locations of one or more client devices as well as updating and/or confirming the RF neighborhood graph.

In some instances, the location of a client device may be determined from analysis of one or more probe reports based on the signal strength of the client device's probe request reported by one or more APs. For example, three APs may each receive a probe request from a client device (identified by the MAC address within the probe request) having the same signal strength. Therefore, from the probe reports of the three APs, the NCD 110 may determine that the client device is located in the center of the three APs and equidistant from each (e.g., by using trilateration). Similarly, the NCD 110 may update and/or confirm the RF neighborhood graph by determining the approximate location of one or more APs based on probe requests received by each AP (e.g., by using trilateration). It should be noted that relative placement of the APs may be determined based on received messages based on trilateration as well as distance.

For example, referring to FIG. 2, when the APs 120-122 receive a probe request from a single client device within a predetermined timeframe and with a signal strength above a predetermined threshold, but the APs 123-125 do not receive the probe request, the NCD 110 may infer that the APs 123-125 are not neighboring APs within the communication network 100 (e.g., not one-hop APs). In addition, based on the signal strength of the probe request received by each of the APs 120-122, the NCD 110 may determine the relative distance of the APs 120-122 from each other, thereby updating and/or confirming the RF neighborhood graph. The information regarding the probe requests (e.g., client device MAC address, signal strength of probe request received by the APs 120-122 and the timestamp of each received probe request) may be included in a probe report transmitted by the NCD 110.

In yet another embodiment, in order to improve the accuracy of RF neighborhood data collected from probe requests (e.g., probe reports), the NCD 110 may only use data collected from probe requests transmitted by client devices that have remained associated with a single AP for a predetermined amount of time. In such an embodiment, each AP and/or the NCD 110 may maintain the time at which each client device associated with an AP. This improves the accuracy of the RF neighborhood data because maintaining association with a single AP for a predetermined amount of time generally implies that the client device is not moving over a large area within the wireless network. Typically, when a client device disassociates from a first AP and associates with a second AP, the client device has physically moved (e.g., roamed). Therefore, in order to avoid using data collected from a roaming client device, probe requests received from a client device transitioning from a first AP to a second AP within the predetermined time frame after transmitting the probe request may be ignored for purposes of updating and/or confirming the RF neighborhood graph and/or for load balancing.

4. Load Balancing

The NCD 110 may obtain RF neighborhood data (e.g., probe reports) from the each of the APs 120-125. The NCD 110 may analyze the RF neighborhood data to provide improvements to the communication network 100. For example, the NCD 110 may analyze the RF neighborhood graph to determine neighboring APs, the load on each AP and the location of one or more client devices. Based on this information, the NCD 110 may attempt to balance the load on the communication network by sending a first signal to, for example, the AP 120 to increase its signal power (e.g., broaden its signal coverage area) to attract more client devices, or a second signal to hand-off one or more client devices to, for example, the AP 121 (e.g., when the AP 121 has a lighter load than the AP 120).

In embodiments in which probe reports from client devices include the type of traffic being transmitted by the client device, the NCD 110 may balance the load of one or more APs by correlating the probe reports to determine the loads carried by each of the APs 120-125. The NCD 110 may then transmit a signal to, for example, the AP 121 hand-off one or more client devices transmitting a certain type of traffic (e.g., streaming video traffic).

In addition, the NCD 110 may steer clients requesting to the join the communication network 100. For example, the AP 120 may transmit a notification to the NCD 110 that a client device is attempting to join the communication network 100. The NCD 110 may analyze the RF neighborhood graph and determine the new client device is best suited to associate with, for example, the AP 121 based on the loads currently being handled by the APs within range of the new client device. The signal transmitted by the NCD 110 may include an instruction to the AP 120 to deny a request to associate by the client device so that the client device associates with the AP 121.

According to FIG. 4, a block diagram illustrating communication between an access point and a network coordination device is shown. The communication illustrated in FIG. 4, may include one or more of the following: RF neighborhood graph queries, probe report queries, probe reports and/or RF neighborhood data. The communication. may be implemented using either, or both, of a "push" or "pull" delivery configuration. Regarding the AP 120, in a "push" delivery configuration, the AP 120 transmits the RF neighborhood data collected from received beacons while in the discovery mode to the NCD 110 without receiving a request from the NCD 110. Similarly in a "push" delivery configuration, the. AP 120 may transmit the data collected from one or more probe requests ("probe reports") to the NCD 110 without receiving a request. The AP 120 may transmit the RF neighborhood data and/or the one or more probe reports immediately upon collecting the data or at particular triggering events such as at predetermined time intervals and/or after a predefined number of beacons/probe requests have been received.

Regarding the AP 120, in a "pull" delivery configuration, the AP 120 may wait for a request from the NCD 110 prior to transmitting RF neighborhood data collected from beacons and/or probe reports.

Regarding the NCD 120, in a "push" delivery configuration, the NCD 110 may transmit a RF neighborhood graph to the APs 120-125 upon completion of the generation of the graph without a request from the APs. In addition, the NCD 110 may also transmit, without request, one or more probe reports to one or more APs. For example, referencing FIG. 2, the NCD 110 may transmit any probe report received from the AP 122 to the AP 121 without request from the AP 121 based on the NCD 110 being configured to provide probe requests to one-hop neighboring APs as established by the RF neighborhood graph.

Regarding the NCD 110, in a "pull" delivery configuration, the NCD 110 may wait to transmit the RF neighborhood graph and/or RF neighborhood data (e.g., probe reports) received from, for example, the APs 121-125 to the AP 120 upon request.

Figure 5:
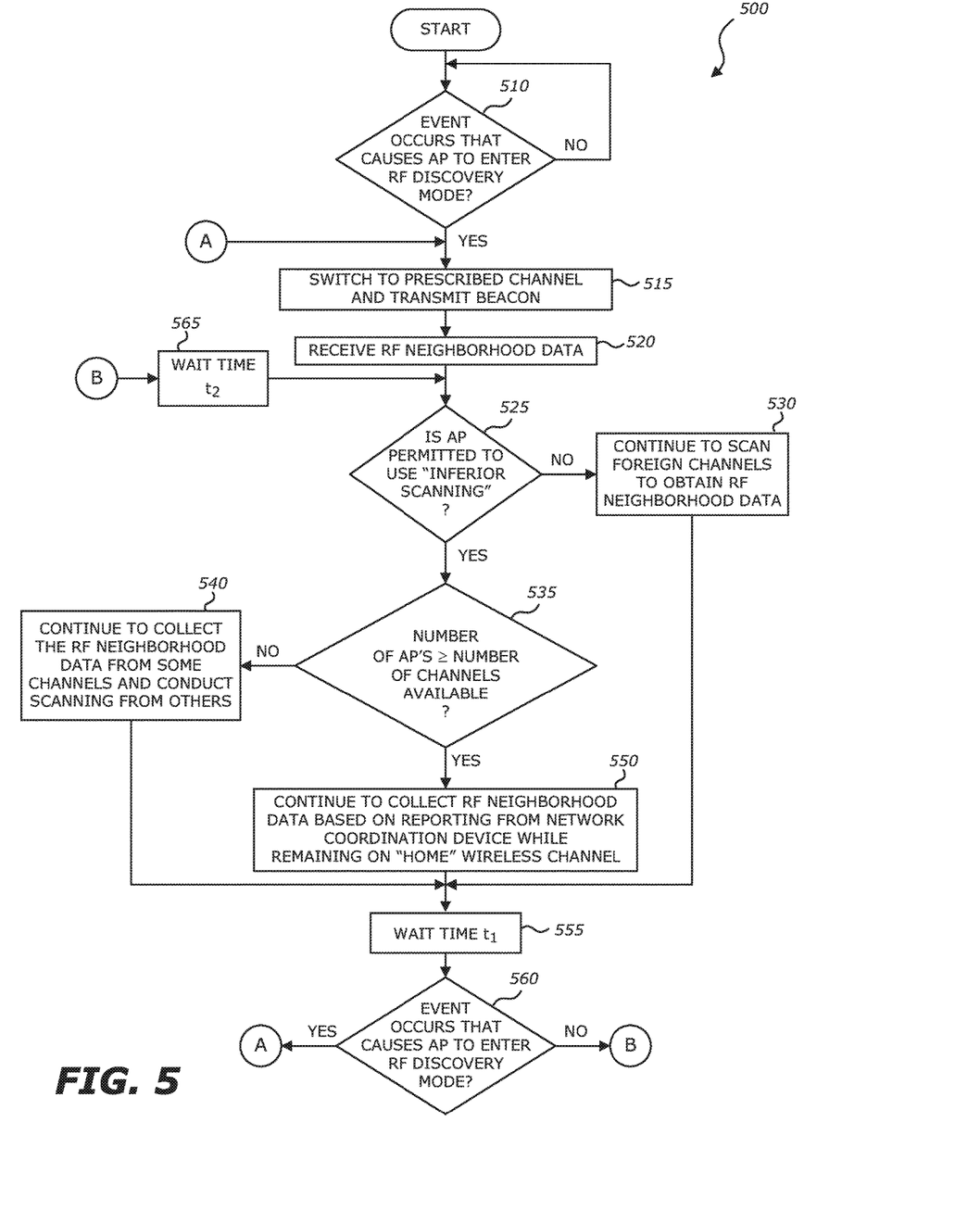
FIG. 5 is a flowchart illustrating an exemplary method for obtaining wireless scan information without performing scanning or performing limited scanning.

IV. Example Methodology for Obtaining Wireless Scanning Information without Performing Scanning or Performing Limited Scanning According to FIG. 5, a flowchart illustrating an exemplary method for obtaining wireless scanning information without performing scanning or performing limited scanning is shown. Each block in FIG. 5 represents an operation performed in the exemplary method 500. These operations are conducted by an AP in efforts to automatically, without human interaction, gather data associated with a RF neighborhood graph and, upon generation of the RF neighborhood graph, avoid scanning when possible.

A first determination is made as to whether an event has occurred that causes an AP within a communication network to enter the RF discovery mode (operation 510). When no event has occurred causing the AP to enter the RF discovery mode, the AP continues its normal operation of transmitting and receiving data (e.g., network traffic). However, when an event has occurred that causes the AP to enter the discovery mode (e.g., instruction by the NCD), the AP switches to a prescribed channel (e.g., set forth by the NCD) and transmits a beacon at a fixed time and signal strength (operation 515). While in discovery mode, the AP may receive RF neighborhood data (e.g., one or more beacons) from other APs within the same wireless communication network (operation 520). Additionally, in one embodiment, upon receiving RF neighborhood data, the AP may transmit the data to the NCD and, in response, receive a RF neighborhood graph setting forth the locations of each AP associated with the NCD.

After receiving RF neighborhood data, a determination is made as to whether the AP may use "inferior scanning" (operation 525). Inferior scanning may include (i) no scanning by the AP or (ii) scanning of a subset of the wireless channels supported by the wireless network, which is less than all available wireless channels. When inferior scanning is not permitted, the AP continues to periodically scan foreign channels to obtain RF neighborhood data (operation 530). Subsequently, the AP waits a time $t_1$ (operation 555) prior to making a determination as to whether an event has occurred that causes the AP to enter the RF discovery mode (operation 560). When an event that causes the AP to enter the RF discovery mode has occurred, the AP switches to a prescribed channel and transmits a beacon at a fixed time and signal strength (operation 515). When no such event has occurred, the AP waits a time $t_2$ (operation 565) prior to making a determination as to whether the AP is permitted to use inferior scanning (operation 525).

However, when inferior scanning is permitted, a determination is made as to whether the number of APs associated with the NCD is greater than or equal to the number of channels available on the wireless communication network (operation 535). When the number of APs is less than the number of channels available, the AP obtains RF neighborhood data of foreign channels on which APs are operating (via probe reports from the NCD) and continues to periodically scan foreign channels on which no AP is operating (operation 540). In addition, the AP collects RF neighborhood data of its home channel based on probe requests transmitted by client devices. Subsequently, the AP waits a time $t_1$ (operation 555) prior to making a determination as to whether an event has occurred that causes the AP to enter the RF discovery mode (operation 560). When an event that causes the AP to enter the RF discovery mode has occurred, the AP switches to a prescribed channel and transmits a beacon at a fixed time and signal strength (operation 515). When no such event has occurred, the AP waits a time $t_2$ (operation 565) prior to making a determination as to whether the AP is permitted to use inferior scanning (operation 525).

When the number of APs is greater than or equal to the number of wireless channels available, the AP collects RF neighborhood data based on reporting from the NCD while remaining on its home channel (operation 550). In addition, the AP collects RF neighborhood data of its home channel based on probe requests transmitted by client devices. Subsequently, the AP waits a time $t_1$ (operation 555) prior to making a determination as to whether an event has occurred that causes the AP to enter the RF discovery mode (operation 560). When an event that causes the AP to enter the RF discovery mode has occurred, the AP switches to a prescribed channel and transmits a beacon at a fixed time and signal strength (operation 515). When no such event has occurred, the AP waits a time $t_2$ (operation 565) prior to making a determination as to whether the AP is permitted to use inferior scanning (operation 525).

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    collecting, by a first access point operating in a first mode in a wireless network, a first set of data from at least a second access point in the wireless network;
    transmitting a second set of data to and receiving a third set of data from at least one client device associated with the wireless network by the first access point in a second mode;
    determining whether a number of access points in the wireless network is greater than or equal to a number of wireless channels supported by the wireless network;
    in response to the number of access points in the wireless network being greater than or equal to the number of wireless channels supported by the wireless network:
        collecting, by the first access point, network data over a first wireless channel supported by the wireless network; and
        receiving, by the first access point, network data associated with other wireless channels supported by the wireless network from a network coordination device (NCD), wherein the NCD collects network data from each access point in the wireless network to generate a radio frequency (RF) neighborhood graph, and wherein the network data received by the first access point from the NCD is based on the RF neighborhood graph.

2. The method of claim 1, further comprising: in response to the number of access points in the wireless network being less than the number of wireless channels of the wireless network: collecting, by the first access point, network data of the first wireless channel supported by the wireless network receiving, by the first access point, network data of a second wireless channel supported by the wireless network from the NCD; and scanning, by the first access point, a third wireless channel supported by the wireless network for network data, wherein no access point in the wireless network operates on the third wireless channel.

3. The method of claim 1, wherein network data comprises: a media access control (MAC) address of at least another access point in the wireless network, a MAC address of at least one client device, a signal strength of a received probe request from the at least one client device, a time of receipt of the received probe request from the of the at least one client device, a location of the at least another access point in the wireless network, an operating channel corresponding to the at least another access point in the wireless network, a location of the at least one client device, a particular access point with which the at least one client device is associated in the wireless network, a load on a wireless channel supported by the wireless network, and an operating requirement of the at least one client device.

4. The method of claim 1, further comprising: detecting, by the first access point, an event that causes the first access point to enter the first mode.

5. The method of claim 4, wherein the event is a detection of a threshold number of access points being added to the wireless network in an active state.

6. The method of claim 4, wherein the event is a detection of a threshold number of access points in the wireless network being placed in an inactive state.

7. The method of claim 1, wherein collecting network data in the first mode comprises the first access point scanning a particular wireless channel of the wireless network for beacon messages from the from at least another access points in the wireless network.

8. The method of claim 7, wherein the beacon messages are transmitted by the at least another access point at a particular signal strength.

9. The method of claim 1, wherein the first access point transmits, in the first mode, a beacon message on a particular wireless channel, at a particular time, and with a particular signal strength.

10. The method of claim 1, further comprising: receiving, by the first access point, a probe request from a first client device within the wireless network; analyzing the probe request to determine that the RF neighborhood graph is to be regenerated; in response to determining the RF neighborhood graph is to be regenerated, transmitting a signal to the NCD indicating that the RF neighborhood graph is to be regenerated.

11. The method of claim 10, further comprising:
    receiving a regenerated RF neighborhood graph from the NCD in response to transmitting the signal to the NCD that the RF neighborhood graph is to be regenerated.

12. The method of claim 10, wherein the RF neighborhood graph comprises a logical construct of the geographic locations of each access point in the wireless network.

13. The method of claim 10, wherein the RF neighborhood graph comprises a geographic location of the first client device associated with the wireless network.

14. The method of claim 10, wherein the probe request comprises a media access control (MAC) address of the first client device.

15. The method of claim 10, wherein analyzing the probe request comprises correlating the MAC address of the first client device, a time of receipt of the probe request, and a signal strength of the probe request with the RF neighborhood graph.

16. The method of claim 10, wherein the probe request is analyzed in response to the first client device being associated with a single access point in the wireless network for a threshold period of time.

17. The method of claim 10, wherein the first access point waits for a request from the NCD before transmitting the signal to the NCD indicating that the RF neighborhood graph is to be regenerated.

18. The method of claim 1, further comprising: receiving, by the first access point from the NCD, an instruction to enter a first mode for collecting network data from at least another access point in the wireless network.

19. A network device comprising:
a memory;
a process executing instructions stored in the memory to:
collect, while the network device operating in a first mode in a wireless network, a first set of data from at least a second access point in the wireless network;
transmit a second set of data to and receiving a third set of data from at least one client device associated with the wireless network by the network device in a second mode;
determine whether a number of access points in the wireless network is greater than or equal to a number of wireless channels supported by the wireless network;
in response to the number of access points in the wireless network being greater than or equal to the number of wireless channels supported by the wireless network:
collect network data over a first wireless channel supported by the wireless network; and
receive network data associated with other wireless channels supported by the wireless network from a network coordination device (NCD), wherein the NCD collects network data from each access point in the wireless network to generate a radio frequency (RF) neighborhood graph, and wherein the received network data associated with the other wireless channels from the NCD is based on the RF neighborhood graph.

20. A non-transitory computer readable medium comprising instructions which, when executed by a hardware processor within a first access point, causes the processor to:
collect, while the first access point operating in a first mode in a wireless network, a first set of data from at least a second access point in the wireless network;
transmit a second set of data to and receiving a third set of data from at least one client device associated with the wireless network by the network device in a second mode;
determine whether a number of access points in the wireless network is greater than or equal to a number of wireless channels supported by the wireless network;
in response to the number of access points in the wireless network being greater than or equal to the number of wireless channels supported by the wireless network:
collect network data over a first wireless channel supported by the wireless network; and
receive network data associated with other wireless channels supported by the wireless network from a network coordination device (NCD), wherein the NCD collects network data from each access point in the wireless network to generate a radio frequency (RF) neighborhood graph, and wherein the received network data associated with the other wireless channels from the NCD is based on the RF neighborhood graph.

* * * * *